United States Patent [19]

Talansky et al.

[11] 4,227,308

[45] Oct. 14, 1980

[54] INTERFACE DEVICE

[75] Inventors: Alan R. Talansky; Herman M. Respess, both of Greensboro; William A. Borst, Brown Summit, all of N.C.

[73] Assignee: Tibar Corporation, Reidsville, N.C.

[21] Appl. No.: 942,743

[22] Filed: Sep. 15, 1978

[51] Int. Cl.² .............................................. G01B 3/28
[52] U.S. Cl. .............................. 33/169 B; 33/172 E; 235/92 DN
[58] Field of Search ............ 33/147 N, 143 L, 172 E, 33/169 R, 169 B, 174 L, 125; 235/92 DN, 92 MD, 92 MT, 92 BN, 92 DD, 92 EA; 340/678, 624; 364/560–563; 73/313, 308; 200/292

[56] References Cited

U.S. PATENT DOCUMENTS

| | | | |
|---|---|---|---|
| 2,287,273 | 6/1942 | Rabb | 33/169 B |
| 3,298,605 | 1/1967 | Bucke et al. | 33/143 L |
| 3,659,083 | 4/1972 | Winter et al. | 235/92 BD |
| 3,903,609 | 9/1975 | Brown | 33/185 R |
| 4,095,273 | 6/1978 | Gonzalez | 33/125 R |
| 4,125,022 | 11/1978 | Sumida | 73/313 |

FOREIGN PATENT DOCUMENTS

| | | | |
|---|---|---|---|
| 45-26188 | 8/1970 | Japan | 33/172 E |
| 338971 | 7/1959 | Switzerland | 33/172 E |

*Primary Examiner*—Harry N. Haroian

[57] ABSTRACT

The present invention consists of a measuring device which employs a mechanical-electrical interface mechanism which can be used to measure the depth of various materials. The invention includes a penetrating means which is in electrical contact with circuitry that includes a LED display.

18 Claims, 10 Drawing Figures

INTERFACE DEVICE

BACKGROUND AND OBJECTIVES OF THE PRESENT INVENTION

Various mechanical tools and instruments have been used in the past to determine the height of various coatings and compositions or for use in determining the depths of notches or grooves as are found on vehicle tire treads and other products. The prior art devices have been generally mechanical or pneumatic gauges which frequently need calibration and which are generally difficult to adjust for a proper reading. Also, many of the prior art devices are difficult to obtain an accurate reading therefrom since the markings are small and become worn with use and oftentimes do not provide the preciseness needed and many are difficult to read except under a bright natural or artificial lighting.

With this background the present invention was conceived and one of its objectives is to provide a highly accurate measuring device which is compact and is easily carried by an individual.

It is another objective of the present invention to provide a measuring device having a mechanical-electrical interface which is highly accurate and inexpensive to manufacture.

It is still another objective of the present invention to provide a measuring device with its own power source which would include an illuminated display.

It is yet another objective of the present invention to provide a measuring device which is easily adjusted and can be modified for various applications.

Another objective of the present invention is to provide a measuring device which can be held in one hand when used and which is battery operated.

Other objectives and advantages of the present invention will be understood by those skilled in the art in accordance with the foregoing description.

SUMMARY OF THE INVENTION AND DESCRIPTION OF THE DRAWINGS

The present invention consists of a battery operated hand-held measuring instrument which includes a resiliently mounted material contacting means or plunger which is used to penetrate a coating or for use in measuring the depth of a groove or other opening. The plunger is engageable with a plurality of contact means which act as inputs for its electrical circuitry. The electrical circuitry is designed so that the input signals transform into driving signals for a LED display. Hence, with the plunger means inserted, for example in a tire tread groove the LED will "read-out" the depth of the tread in thirty seconds of an inch in a simple, quick operation. Should other measurements be required, the device can be adjusted to read in millimeters or other units. Another embodiment may have a rotatable wheel member at its lower end.

Turning now to the drawings, FIG. 1 demonstrates a perspective view of the preferred embodiment of the present invention;

Figure 5:
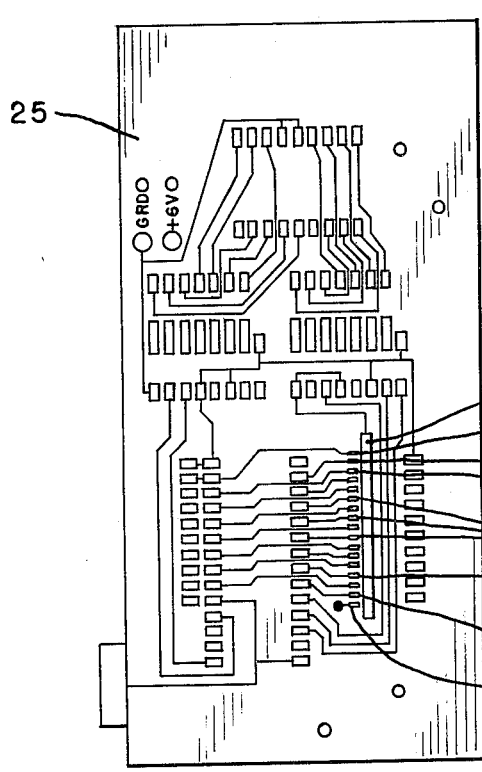
Figure 6:
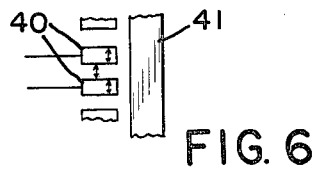

FIG. 5 demonstrates the back of a printed circuit board as can be utilized within the invention;

FIG. 6 is an enlarged view of selected metering contacts and a partial view of the common ground means.

Figure 7:
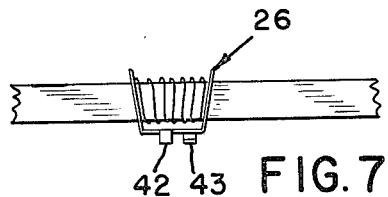

FIG. 7 demonstrates the plunger contact slide; and

Figure 8:
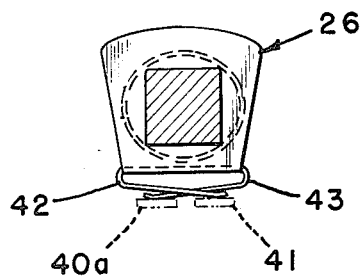

FIG. 8 shows an end view of the plunger contact slide.

Figure 9:
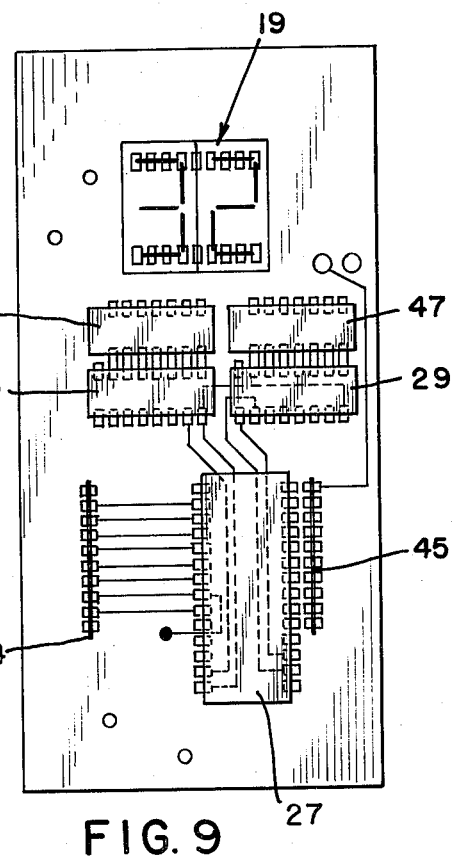
Figure 10:
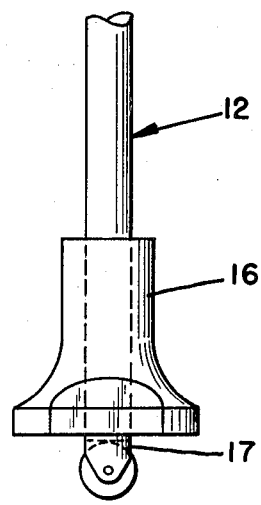

FIG. 9 is a front or component side view of the circuit board as shown in FIG. 5; and FIG. 10 demonstrates a rotatable wheel member at the lower end of the material contacting means.

Figure 1:
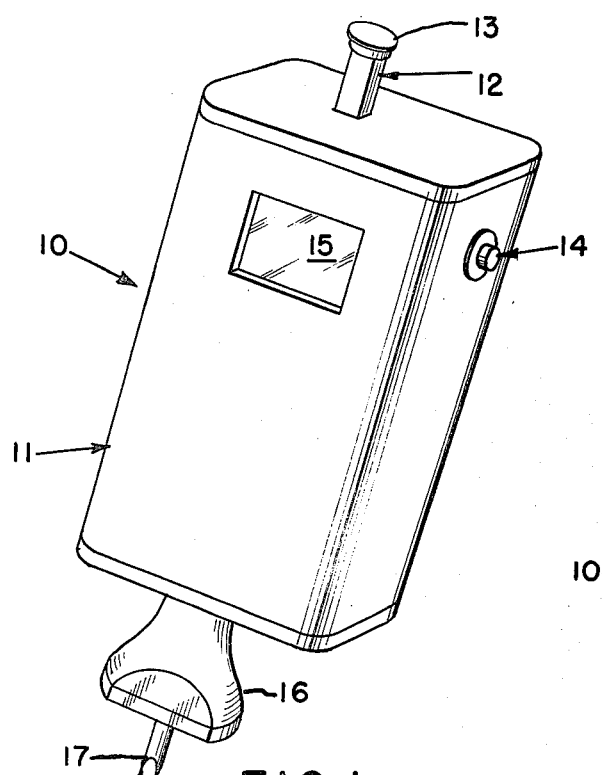

For a more detailed description of the invention, FIG. 1 demonstrates the measuring device 10 of the present invention having an outer case 11, a displaceable plunger assembly 12, an upper thumb support means 13, an on-off "button" 14, and a transparent display window 15.

Figure 2:
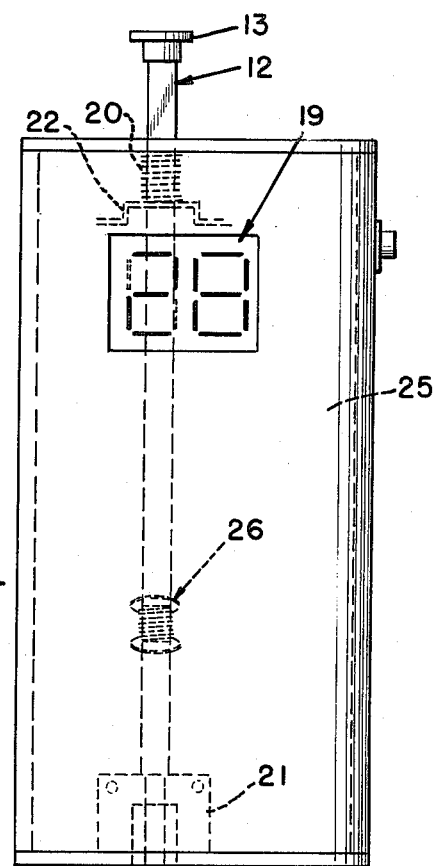
FIG. 2 illustrates a front view of the preferred embodiment.

Shown below outer case 11 is resting means 16 through which penetrating means 17 passes. As shown in FIG. 2, penetrating means 17 has passed through soft, uncured rubber layer 18 and LED display 19 demonstrates a "28" which corresponds with the 28/32 of an inch represented by the distance "d" shown in FIG. 2. A resilient means 20 is shown in FIG. 2 which returns plunger assembly 12 to a "0" position after it is withdrawn from its reading position. Further shown in FIG. 2 is the attachment of plunger assembly 12 by bracket 21 and support means 22 to printed circuit board 25 (not shown in detail in FIG. 2). The preferred embodiment of the present invention demonstrates a LED display which reads 0-32 and is calibrated to correspond to changes of the penetrating means 17 in 1/32nds of an inch. Other graduations could be employed as desired whether in millimeters, inches or other convenient quantities. Additionally, the outer case is removable so that the batteries can be easily replaced and to provide access in adjusting plunger contact slide 26 as more fully explained below.

Figure 3:
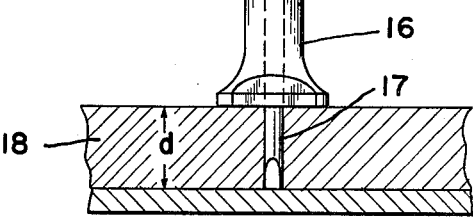
FIG. 3 illustrates a bottom plan view of the device as shown in FIG. 2.

A bottom view of the measuring device is shown in FIG. 3 in which circuit board 25 is demonstrated in outline form between resting means 16 and logic array 27 which is mounted on the component side of circuit board 25.

Figure 4:
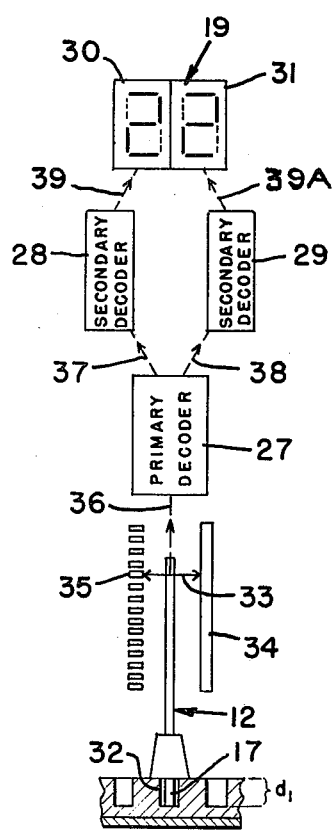
FIG. 4 is a schematic view of the circuitry contained within the preferred embodiment.

Turning to FIG. 4, a schematic illustration of the preferred embodiment of the circuitry of the present invention is shown in which penetrating means 17 is shown extended into a groove 32 which may be, for example a tire tread. The depth of the groove $d_1$ is shown in this example as being 22/32" deep and display 30 registers a "22", thereby demonstrating the depth of groove 32. As further shown, plunger assembly 12 includes a contact slide 33 which completes a circuit between the common ground 34 of the printed circuit board and a particular metering contact 35 in this illustration. With plunger contact slide 33 in the position as shown in FIG. 4, a signal 36 is sent to primary decoding unit or logic array 27 which in turn forwards signals 37 and 38 to secondary decoding units or decoder/drivers 28 and 29 respectively. Decoder/drivers 28 and 29 transmit signals 39 and 39A, respectively, to light emitting diodes 30 and 31 which are of the seven segment type, thus demonstrating a "22" for the exterior of the penetrating means 17. Logic array 27 as used herein is a FPLA such as an 82S100 type produced by Signetics Corporation of Sunnyvale, California.

FIG. 5 shows the circuit side of printed circuit board 25 having a series of metering contacts 40 and a common ground means 41. An enlarged view of a section of FIG. 5 is shown in FIG. 6 in which metering contacts 40 are shown uniformly spaced from each other and being of the same width. Metering contacts of the preferred embodiment have a width of 1/32 of an inch and a space therebetween of 1/32 of an inch. Seventeen metering contacts are shown which provide a display readout of 0-32 in the preferred embodiment, since each metering contact provides a different readout number and a different number is displayed for contact slide positions between the metering contacts as explained below.

The plunger contact slide 26 is shown in a side view in FIG. 7 having a metering contact connector 42 and a common ground connector 43. As further shown in FIG. 8, metering contact 42 can also contact two metering contacts simultaneously because of its width, for example, metering contacts 40b and 40c can be bridged or contacted at the same time by metering contact 42 and this will provide a readout number intermediate of singular contact with either metering contact 40b or 40c as further explained hereafter.

Table 1 is provided below to demonstrate the input information required for programming logic array 27 in relation to the metering contact as shown in FIG. 5. Also shown are the output patterns which correspond to their respective inputs. As is understood from the data shown in Table 1, the contact slide has a metering contact connector touching metering contact 40a and 40b would produce a LED readout of 02. If the metering contact connector is slightly moved so that only the 40b metering contact is touched, then the LED readout demonstrates a 03, representing 3/32 of an inch in this embodiment. Thus, 33 different codes are available from logic array 27 from 16 input elements. Accordingly, knowing the input code available, the logic array can be programmed by conventional methods to provide the required output pattern.

TABLE 1

| ACTIVE (GROUNDED) INPUTS | OUTPUT PATTERN Binary Representation | | Decimal Representation |
|---|---|---|---|
| NONE | 0000 | 0000 | 00 |
| 40a | 0000 | 0001 | 01 |
| 40a & 40b | 0000 | 0010 | 02 |
| 40b | 0000 | 0011 | 03 |
| 40b & 40c | 0000 | 0100 | 04 |
| 40c | 0000 | 0101 | 05 |
| 40c & 40d | 0000 | 0110 | 06 |
| 40d | 0000 | 0111 | 07 |
| 40d & 40e | 0000 | 1000 | 08 |
| 40e | 0000 | 1001 | 09 |
| 40e & 40f | 0001 | 0000 | 10 |
| 40f | 0001 | 0001 | 11 |
| 40f & 40g | 0001 | 0010 | 12 |
| 40g | 0001 | 0011 | 13 |
| 40g & 40h | 0001 | 0100 | 14 |
| 40h | 0001 | 0101 | 15 |
| 40h & 40i | 0001 | 0110 | 16 |
| 40i | 0001 | 0111 | 17 |
| 40i & 40j | 0001 | 1000 | 18 |
| 40j | 0001 | 1001 | 19 |
| 40j & 40k | 0010 | 0000 | 20 |
| 40k | 0010 | 0001 | 21 |
| 40k & 40l | 0010 | 0010 | 22 |
| 40l | 0010 | 0011 | 23 |
| 40l & 40m | 0010 | 0100 | 24 |
| 40m | 0010 | 0101 | 25 |
| 40m & 40n$_1$ | 0010 | 0110 | 26 |
| 40n$_1$ | 0010 | 0111 | 27 |
| 40n$_1$ & 40o | 0010 | 1000 | 28 |
| 40o | 0010 | 1001 | 29 |
| 40o & 40p | 0011 | 0000 | 30 |
| 40p | 0011 | 0001 | 31 |

TABLE 1-continued

| ACTIVE (GROUNDED) INPUTS | OUTPUT PATTERN Binary Representation | | Decimal Representation |
|---|---|---|---|
| 40p & 40n$_2$ | 0011 | 0010 | 32 |

The secondary decoding units employed as shown in FIG. 9 are decoder/drivers 28 and 29 which are of the BCD to seven segment decoder/driver types which convert the primary decoding unit or logic array 27 primary codes to decimal codes for driving the LED display 19. The decoder/drivers 28 and 29 are well known in the art and are, for example, of the type 7448 manufactured by Signetics Corporation of Sunnyvale, California. Other components are shown in FIG. 9 which are included within the circuitry of the present invention such as resistor arrays 44 and 45 which are composed of eight (8) and eleven (11) 8.2K Ohm resistors. Additional resistor arrays 46 and 47 are shown in juxtaposition to decoder/drivers 28 and 29 respectively. Resistor arrays 46 and 47 are current limiting resistor arrays and each is comprised of seven 390 Ohm resistors.

The circuitry shown in the preferred emboodiment is powered by a six-volt battery although other power sources may be suitable as desired.

During use, the measuring device of the present invention is placed with resting means 16 against the material to be measured. The operator can then press plunger assembly 12 down into the coating or other material to be measured by applying firm pressure against thumb support means 13 which forces penetrating means 17 into the particular material being measured. When the plunger assembly 12 reaches its lowermost position depending upon the pressure applied to plunger assembly 12, then on-off button 14 as shown in FIG. 1 is depressed whereby the LED display will demonstrate from 0-32 the particular depth or extension of penetration of penetrating means 17. Thereafter, on-off button 14 is released turning off the circuitry of measuring device 10 and with gentle hand pressure the penetrating means 17 can be withdrawn from the tested material. Resilient member 20 as shown in FIG. 2 returns the plunger assembly to a "0" position wherein penetrating means 17 is withdrawn into resting means 16 and is ready for reuse.

The mechanical-electrical interface which includes the plunger assembly 12, the plunger contact slide 26 and the metering and ground contacts provide an economical and accurate arrangement for use in the present metering device and other instruments.

The examples and illustrations shown herein are not meant to limit the present invention and various changes and modifications can be made which fall within the scope of the present invention.

We claim:

1. A measuring device comprising: a displaceable material contacting means, circuit means engageable with said material contacting means, a display means connected to said circuit means, a first and a plurality of secondary electrical contact means included within said circuit means, said secondary contact means being uniformly spaced from each other the width of said secondary contact means and spaced from said first contact means, said secondary contact means being of uniform width, a conducting means joined to said material contacting means, said conducting means being displaceable along said first and secondary contact means, said conducting means having a width greater than the width of said secondary contact means whereby said conducting means is capable of contacting two secondary contact means simultaneously.

2. A measuring device as claimed in claim 1, wherein said material contacting means includes a resting means.

3. A measuring device as claimed in claim 1, wherein said circuit means includes input means, said input means being connected to primary decoding unit, said primary decoding unit being in communication with a secondary decoding unit, said secondary decoding unit being in communication with a display means whereby said display means demonstrates the displacement of said material contact means.

4. A measuring device comprising: a displaceable material contacting means, circuit means engageable with said material contacting means, a display means connected to said circuit means, a first and a plurality of secondary electrical contact means included within said circuit means, said secondary contact means being uniformly spaced from each other the width of said secondary contact means and spaced from said first contact means, said secondary contact means being of uniform width, a conducting means joined to said material contacting means, said conducting means being displaceable along said first and secondary contact means, said conducting means having a width greater than the width of said secondary contact means whereby said conducting means is capable of contacting two secondary contact means simultaneously, a primary decoding unit, said primary decoding unit being connected to a secondary decoding unit, said secondary decoding unit being connected to said display means demonstrating the displacement of said material contacting means.

5. A measuring device as claimed in claim 1, wherein said material contacting means includes a slide member.

6. A measuring device as claimed in claim 1, wherein said primary decoding unit is connected to a plurality of secondary decoding units.

7. A measuring device as claimed in claim 3, wherein each of said secondary decoding units are connected to independent display means.

8. A measuring device as claimed in claim 1, wherein said display means comprises a seven-segment light emitting diode.

9. A measuring device as claimed in claim 1, wherein said primary decoding unit comprises a static logic encoder.

10. A measuring device as claimed in claim 1, wherein said secondary decoding unit comprises a BCD to 7 segment decoder/driver.

11. A measuring device as claimed in claim 1, wherein said device is battery powered.

12. A measuring device as claimed in claim 1, wherein said material contacting means is slideabely mounted.

13. A measuring device as claimed in claim 1, wherein said displaceable material contacting means includes a plunger member.

14. A measuring device as claimed in claim 1, wherein said displaceable material contacting means includes a rotatable wheel means.

15. A mechanical-electrical interface means comprising: a support means, a first electrical contact means on said support means, a plurality of secondary electrical contact means uniformly spaced from each other the width of said secondary contact means and being spaced from said first contact means on said support means, said secondary contact means being of uniform width, a mechanical conducting means, said conducting means being displaceable along said first and secondary contact means, said conducting means having a width greater than the width of said secondary contact means for contacting two secondary contact means simultaneously, said conducting means being displaceable along said first contact means while remaining in electrical contact therewith and being selectively engageable with one or more of said secondary contact means.

16. A mechanical-electrical interface means as claimed in claim 15, wherein said mechanical conducting means comprises a slide member.

17. A mechanical-electrical interface means as claimed in claim 16, wherein said slide member has first and second engaging fingers, said first engaging finger contacting said first electrical contact means and said second finger being releasably engageable with secondary contact means.

18. A mechanical-electrical interface means as claimed in claim 17, wherein said second engaging finger is twice the width of said secondary contact means.

* * * * *